US006462889B1

(12) United States Patent
Jackson

(10) Patent No.: US 6,462,889 B1
(45) Date of Patent: Oct. 8, 2002

(54) CONFORMAL-DOME OPTICAL SYSTEM WITH ROTATIONALLY SYMMETRIC STATIONARY OPTICAL BAFFLES

(75) Inventor: Jeremie E. Jackson, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 15 days.

(21) Appl. No.: 09/599,375

(22) Filed: Jun. 22, 2000

(51) Int. Cl.$^7$ .......................... G02B 17/00; G02B 9/00; G02B 3/00; G06F 19/00
(52) U.S. Cl. ...................... 359/728; 359/642; 359/648; 359/729; 244/3.17
(58) Field of Search ............................... 359/642, 648, 359/726, 727, 728, 711, 731, 729, 725, 637, 815, 554, 894, 511; 244/3.17

(56) References Cited

U.S. PATENT DOCUMENTS

| 4,106,855 A | * | 8/1978 | Coon | 359/723 |
| 5,220,159 A | * | 6/1993 | Friedenthal | 250/201.9 |
| 5,854,713 A | * | 12/1998 | Kuroda et al. | 359/850 |
| 5,946,143 A | * | 8/1999 | Whalen | 359/728 |
| 6,198,564 B1 | * | 3/2001 | Knight | 359/214 |

* cited by examiner

*Primary Examiner*—Georgia Epps
*Assistant Examiner*—Tim Thompson
(74) *Attorney, Agent, or Firm*—Colin M. Raufer; Leonard A. Alkov; Glenn H. Lenzen, Jr.

(57) ABSTRACT

An optical system includes a nonspherical outer dome that is rotationally symmetric about a central axis, a detector system, and an optical corrector positioned in an optical path between the outer dome and the detector system. At least one light baffle is positioned in the optical path between the outer dome and the detector system and is fixed in space relative to the central axis. There are typically from one to three baffles, each affixed to either the inter surface of the outer dome or to the optical corrector. Each baffle is a frustoconical tube that is rotationally symmetric about the central axis. A set of fins may be supported on one of the baffles, with each fin extending radially outwardly from an outer surface of the baffle and parallel to the central axis. The baffles combine to reduce stray light that otherwise would enter the optical system.

14 Claims, 4 Drawing Sheets

CONFORMAL-DOME OPTICAL SYSTEM WITH ROTATIONALLY SYMMETRIC STATIONARY OPTICAL BAFFLES

This invention was made with Government support under Subcontract DAAH01-97-C-0084, to Government Prime Contract No.MDA972-96-C-0800. The Government has certain rights in this invention.

This invention relates to an optical system having a nonspherical dome window, and, more particularly, to the baffling of stray light to prevent its entry into the detector system and its sensor.

BACKGROUND OF THE INVENTION

An optical system includes an optical train with a sensor that receives radiated energy from a scene and converts it to an electrical signal. The electrical signal is provided to a display or further processed for automated pattern recognition. The sensor is fragile and is easily damaged by dirt, erosion, chemicals, or high air velocity.

In service, the sensor is placed behind a transparent, dome-shaped window through which it views the scene and which protects the sensor from such external effects. If the dome-shaped window is nonspherical, highly curved, and thick, it introduces significant wavefront aberration into the optical rays that pass through it on the way to the sensor. As discussed in U.S. Pat. No. 6,028,712, a transparent optical corrector may be placed in the optical path between the dome and the sensor to compensate for the aberration introduced by the nonspherical window.

Reflections from one or more thicknesses of transparent material may introduce stray light rays into the optical system that are unrelated to the scene light rays that are the subject of interest. An analogy, although somewhat imperfect, is the pattern that may sometimes be seen as the reflection from the windshield by the driver of an automobile. Under the right light conditions, the driver may see reflections in the windshield of objects outside the automobile that are not in the viewed scene. The pattern recognition system of the human mind can normally distinguish the viewed scene from the reflected pattern, but the pattern recognition systems of presently available image processors are not that sophisticated.

In the optical system, the stray light rays, if reflected into the sensor, may be misinterpreted by the pattern recognition system as having come from the scene, may obscure the scene, or may blind the sensor if sufficiently strong. One particularly troublesome source of stray light rays is the sun. Even after the light rays of the sun are reflected multiple times, they may still be orders of magnitude brighter than objects of interest in the scene.

There is a need for an approach to preventing stray light from interfering with the sensing of a scene in an optical system. The present invention fulfills this need, and further provides related advantages.

SUMMARY OF THE INVENTION

The present invention provides an optical system having a conformal (nonspherical) outer dome and an optical corrector. Stray light is excluded so that it cannot reach the sensor and damage the sensor and/or be misinterpreted in the pattern recognition process. The present approach does not require any modification of the detector system and greatly reduces the amount of computation required to distinguish stray signals. It is readily implemented in such optical systems.

In accordance with the invention, an optical system comprises a nonspherical outer dome that is rotationally symmetric about a central axis, a detector system including a sensor, and an optical corrector comprising a transparent body having an optical corrector shape responsive to a shape of the outer dome and positioned in an optical path between the outer dome and the detector system. There is additionally at least one light baffle positioned in the optical path between the outer dome and the detector system and fixed in space relative to the central axis. Each light baffle comprises a frustoconical tube (i.e., a tubular wall with a hollow interior) that is rotationally symmetric about the central axis. Where there are multiple baffles, they are desirably shaped so that the extrapolated apex of the innermost baffle is farther from the nose of the outer dome than the extrapolated apex of the outermost baffle.

There may be a single baffle, two baffles of increasing diametral size, three baffles of increasing diametral size, or more baffles if needed. The baffles are typically affixed to an inner surface of the outer dome or to a surface of the optical corrector.

An additional baffling effect may be achieved with a finned baffle having a set of fins supported on the baffle. Each fin extends radially outwardly from an outer surface of the frustoconical baffle and lies parallel to the central axis. The fins are symmetrically positioned about the central axis, typically with six fins in six-fold symmetry about the central axis. The finned baffle, if any, is preferably the innermost of the baffles if multiple baffles are present, but others of the baffles may be finned as well.

The innermost baffle desirably has a base diameter substantially equal to a diameter of an entrance pupil of the optical system and a length such that no interior reflected rays may pass through its center. Moving outwardly, the next baffle desirably has a base diameter such that a first skew ray may reflect off the outer dome and pass completely around the first baffle, and a length such that no interior reflected rays may pass through its center. These design principles are followed in selecting the positions and lengths of additional baffles.

The present approach recognizes that, once stray light has reached the detector system including its lens system and sensor, the stray light cannot be readily distinguished by the pattern recognition computer from a light ray of interest from the scene, and may even damage the sensor if sufficiently strong. A baffle system is therefore used to prevent stray light from reaching the detector system. However, the introduction of a baffle system may interfere with the transmission of light reaching the sensor, and may also have its own thermal signature that is sensed by the sensor. The present thin-ring frustoconical baffles minimize these potential adverse effects while preventing a large fraction of possible types of stray light from reaching the sensor. The use of this physical baffling to prevent stray light from reaching the sensor avoids the need for using large portions of the computing power of the pattern recognition processor for negating spurious signals. The risks of stray light obscuring the scene or blinding of the sensor by stray light are also minimized.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 9(a) and 9(b) are graphs illustrating the point-source transmission of the optical system, wherein FIG. 9(a) is for an optical system with no baffles and FIG. 9(b) is for an optical system with baffles.

DETAILED DESCRIPTION OF THE INVENTION

Figure 1:
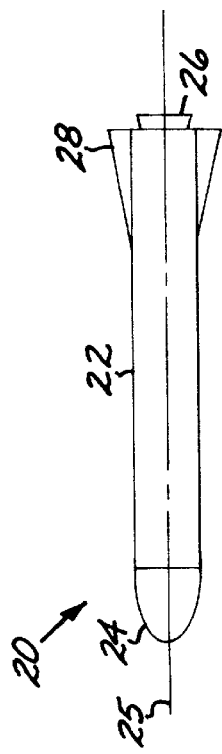
FIG. 1 is a schematic elevational view of a missile having an optical system.

FIG. 1 depicts a flight vehicle, in this case a supersonic missile 20, having a fuselage 22 with a curved nonspherical outer dome window 24 ("outer dome") attached to a forward end of the fuselage. The outer dome 24 is illustrated as a nose dome that protrudes at least partially into the airstream of the missile 20. The fuselage 22 is elongated along a central axis 25, and in a preferred application the outer dome 24 is nonspherical and rotationally symmetric about the central axis 25. By "rotationally symmetric" is meant that the three-dimensional shape, here of the outer dome 24, may be generated by the rotation of a curve or line about the central axis 25. The missile 20 further includes a rocket motor 26 within the fuselage 22 and guidance surfaces 28 attached to the fuselage 22. The missile 20 with the nose dome 24 is the preferred application of the optical system of the invention, but it is applicable in other contexts as well such as other missile domes and domes on manned aircraft.

The nonspherical outer dome 24 is part of an optical system 30. The optical system 30 further includes a detector system 32 having a sensor 34 mounted in a dewar 36. The sensor 34 is preferably an infrared focal plane array (FPA) sensor, as known in the art. An optical train, here represented as a solid catadioptric imaging lens 38, guides and focuses an intended optical ray 40 traveling along an optical path (coincident with the optical ray 40) from a scene to the sensor 34. (The term "catadioptric" is sometimes spelled "catadioptic", and the terms are used herein interchangeably. Both terms are sometimes abbreviated as a "cat" lens. The terms all refer to a single physical component that incorporates reflective and refractive elements.) The detector system 32, including the sensor 34, the dewar 36, and the lens 38 is mounted on a gimbal, whose transverse rotational axis is represented at numeral 42. The illustrated gimbal is a roll-nod gimbal that nods about the transverse axis 42 and rolls about the central axis 25, but other types of gimbals, such as an x-y gimbal, may be used.

Because the outer dome 24 is nonspherical, it is preferred that an optical corrector 44 be positioned in the optical path optically between the outer dome 24 and the detector system 32. The optical corrector 44 comprises at least one body which is transparent to the wavelengths detected by the sensor 34 and has an optical corrector shape responsive to a shape of the outer dome 24. In the illustration, the optical corrector 44 includes two transparent bodies 44a and 44b, but more or fewer could be present. The optical corrector 44 is affixed to the fuselage 22, and immovable relative thereto, in the illustrated embodiment, but the optical corrector 44 could be movable. The structure and use of optical correctors are discussed more fully in U.S. Pat. No. 6,028,712.

At least one light baffle is positioned in the optical path between the outer dome 24 and the detector system 32. There may be one baffle, two baffles, three baffles, or more. In general, it is preferred to use as few baffles as necessary to perform the desired baffling of stray light, as increasing numbers of baffles adversely affect the intended light reaching the sensor from the scene, and also because it becomes increasingly difficult to position, align, and attach larger numbers of baffles within the interior space of the nose dome 24. The baffles are fixed in space relative to the central axis 25. That is, the baffles are not gimbaled to move with the detector system 32.

Figure 3:
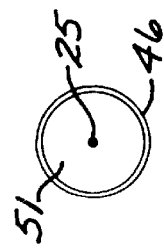
FIG. 3 is a sectional view of one of the baffles of FIG. 2, taken on line 3—3.
Figure 2:
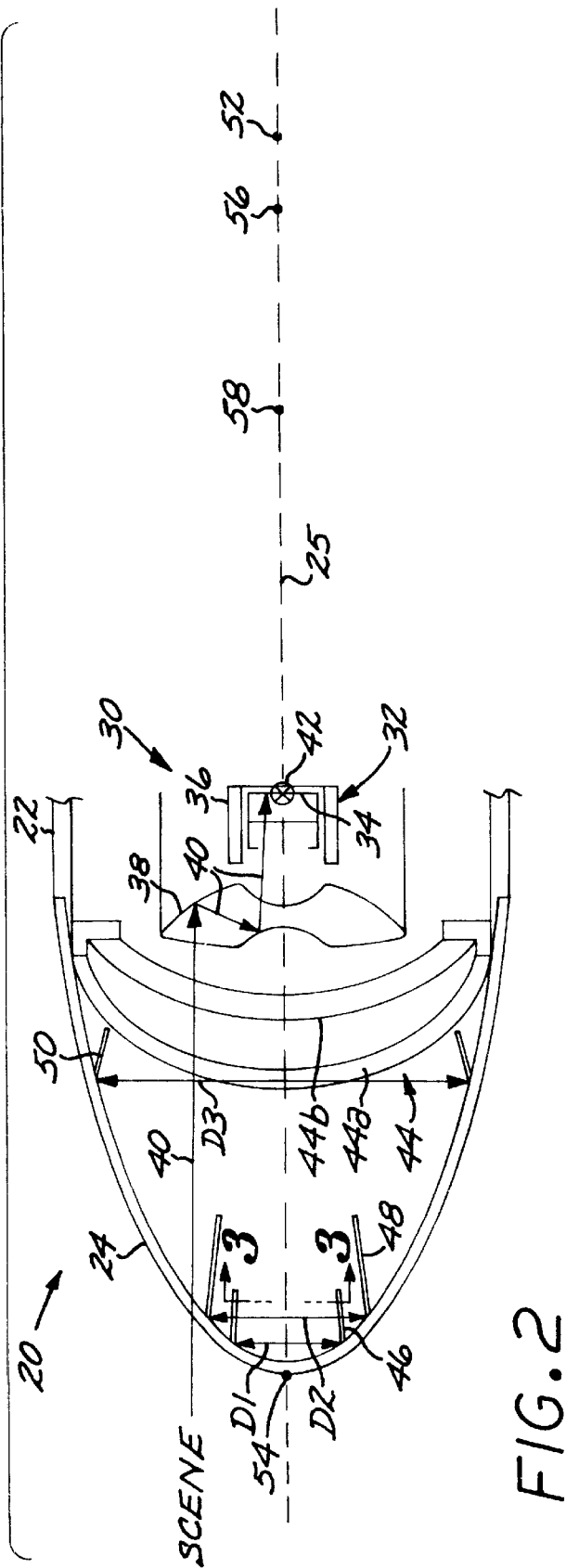
FIG. 2 is a schematic elevational view of the internal structure of the forward end of the missile.

In FIG. 2, three light baffles 46, 48, and 50 are illustrated. Each light baffle 46, 48, and 50 comprises an optically opaque frustoconical tube that is rotationally symmetric about the central axis 25, as seen in FIG. 3. The tube has a hollow interior 51. The first baffle 46 has a diameter D1 at its base, the second baffle 48 has a diameter D2 at its base, and the third baffle 50 has a diameter D3 at its base. D2 is greater than D1, and D3 is greater than D2. The baffles 46, 48, and 50 are each frustums of cones. Each baffle has a respective apex that may be extrapolated from the sides of the frustoconical region. An apex 52 of the first baffle 46 is farther from a nose 54 of the dome 24 than an apex 56 of the second baffle 48. The apex 56 is farther from the nose 54 of the dome 24 than an apex 58 of the third baffle 50. (The nose 54 is the point at which the central axis 25 intercepts an outer surface of the dome 24.)

The light baffles 46, 48, and 50 are present to prevent stray light from reaching the detector system 32 and specifically the sensor 34. Stray light is light which arises from sources other than the scene and are outside of the desired field of view. In the absence of the baffles, the stray light reaches the sensor 34 by reflection from the dome 24 and/or the optical corrector 44. Stray light is distinct from the optical rays 40 that reach the sensor 34 from the scene.

Figure 4:
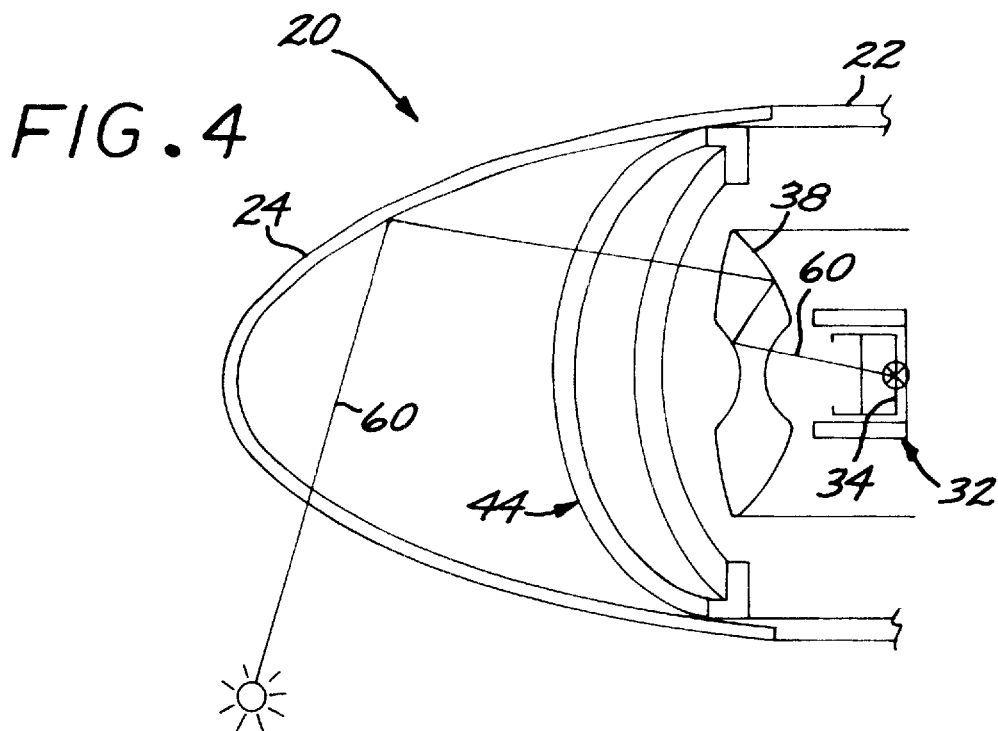
FIG. 4 is a diagrammatic indication of a ray path of a stray light ray in the absence of rotational baffles.

FIG. 4 illustrates a stray light ray 60 that may reach the sensor 34 in the absence of any light baffles. Such a stray light ray 60 may arise from any source, but a particularly troublesome source is the sun. The brightness of the sun is much greater than any potential source in the scene. Even after multiple reflections, each of which attenuates the intensity of the stray light ray 60, the intensity of the stray light ray 60 may be much greater than that of any of the intended optical rays 40 that arise from the scene being viewed. The stray light ray 60 may therefore cause false indications in the sensor output, obscure a region of the field of view, or even damage and blind the sensor elements.

Figure 5:
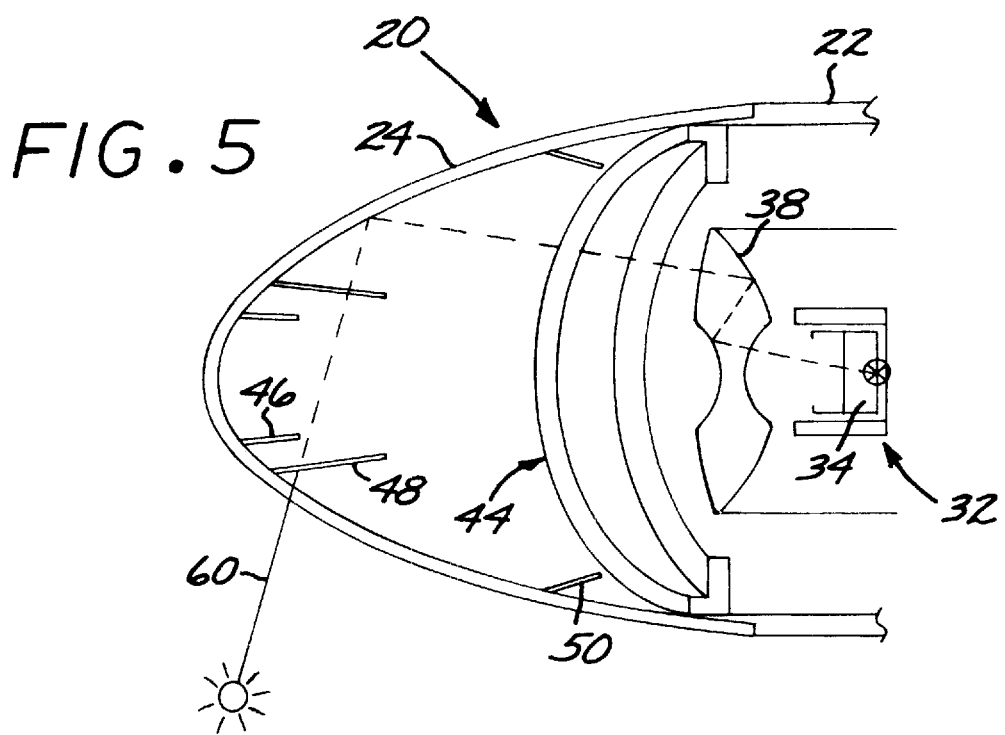
FIG. 5 is a diagrammatic indication of a ray path of a stray light ray when rotational baffles are present.

In FIG. 5, the same stray light ray 60 enters the dome 24, but is intercepted and blocked by one of the light baffles 48. (The dashed extension of the stray light ray 60 shows where it would have propagated but for its being blocked by the baffle 48.) The baffles are opaque bodies, preferably painted or colored black, that do not transmit or reflect incident light rays, and in particular the stray light rays.

FIG. 4 depicts only a single stray light ray 60 to illustrate the nature of the stray light problem and its solution with the use of stationary baffles. In general, there may be stray light rays traveling along an infinity of paths. The baffles are selected, positioned, and designed responsive to the requirement to block stray light traveling along any of the large number of stray light paths that may be encountered in service, for the entire range of look angles required in the gimbal. The dome 24 and the optical corrector 44 are designed by a standard ray path technique such as the Code V software. The large number of stray light ray paths are then simulated by the standard ASAP (Advanced System Analysis Program) software, and the baffles are selected, positioned, and designed using the ASAP software. No single combination of design parameters for the baffles is suitable for all applications, because the dome 24 and the optical corrector 44 may differ in various applications.

There is a cost to using the baffles. Each of the baffles adversely affects the quality of the signal of the light traveling along the light path between the scene and the sensor 34. The adverse effects arise for two reasons. First, each baffle is a physical obstacle that blocks some of the light intensity of the intended optical rays 40. Second, each baffle is a source of infrared energy that has its own thermal signature. It is therefore necessary to achieve a balance between the blocking of stray light paths and the degree of interference with the image quality because of the presence of the baffles. This is accomplished with simulations using the ASAP software and the specific dome 24 and optical corrector 44.

The goal of the rotational baffle design is to provide a minimal obscuration to the primary imaging path while blocking the stray light. The frustoconical tube performs this function quite well because the entrance pupil only uses a portion of the aperture for any selected gimbal angle. The design is therefore optimized for the optical prescription rather than for the entire dome aperture. The baffles are placed such that reflections off the outer dome 24 will not reach the entrance aperture of the solid catadioptric imaging lens 38. For this reason, their placement is determined by the inner and outer edges of its entrance pupil and its known range of gimbal angles. This approach minimizes the required size of the baffles and makes the design approach more straightforward in nature. Rather than attempt to baffle all reflections off the dome from object space, the design emanates a set of rays from the entrance pupil of the solid catadioptric imaging lens to define the placement and extent of the baffles in the following manner.

It is preferred that the first baffle 46 has a first base diameter D1 substantially equal to the inner diameter of an entrance pupil of the optical system 30. The first baffle 46 has a length such that no interior reflected rays may pass through the center of the baffle. The second baffle 48 has a second base diameter D2 greater than the first base diameter D1. The second base diameter D2 is positioned at the location such that a first skew ray may reflect off the outer dome 24 and pass completely around the first baffle 46, and a length such that no interior reflected rays may pass through its center. Larger-size baffles, such as the third baffle 50, are designed in the same manner.

Figure 6:
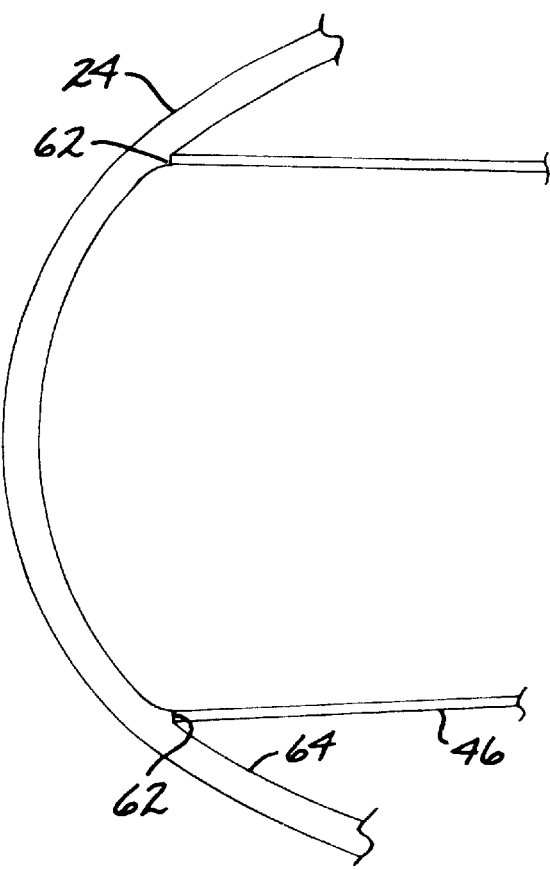
FIG. 6 is a detail of FIG. 2, showing the structure by which a baffle is attached and aligned.

The baffles are affixed to the structure of the missile 20 so that they are stationary and fixed in space relative to the fuselage 22 and the dome 24, as well as to the optical corrector 44 when the optical corrector 44 is a fixed structure. A convenient approach that does not add weight is to affix the baffles to either the dome 24 or to the optical corrector 44 (if the optical corrector 44 is stationary). FIG. 6 illustrates a preferred approach. A shoulder 62 is formed on an interior surface 64 of the dome 24. The baffle, here illustrated as the baffle 46, is affixed to the shoulder 62 with an adhesive. The shoulder 62 supports and aligns the baffle 46.

Figure 7:
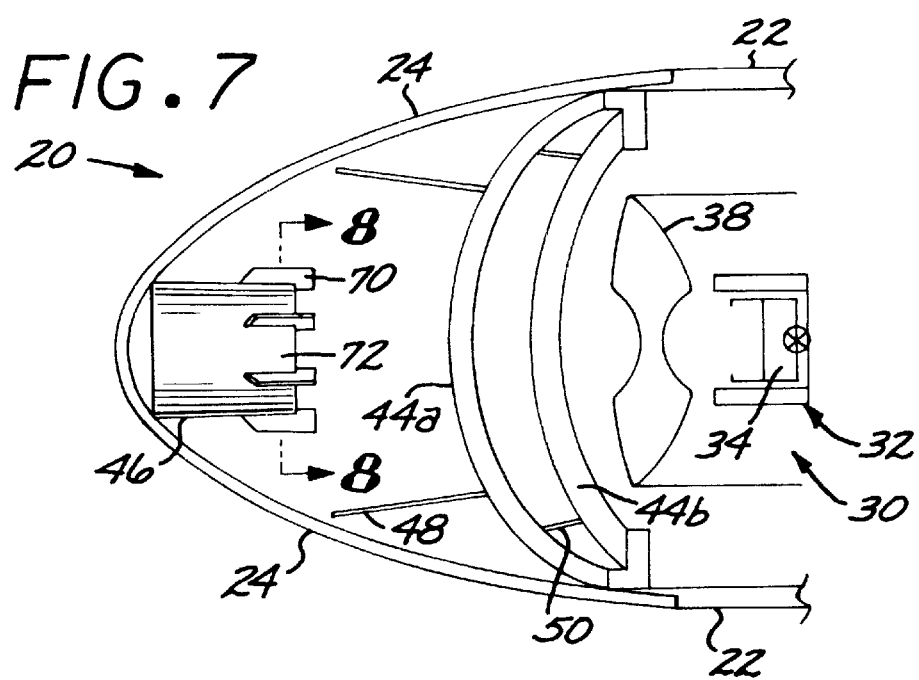
FIG. 7 is a schematic elevational view similar to that of FIG. 2, of another embodiment.

FIG. 7 illustrates another embodiment showing variations of the basic light baffle approach. In FIG. 7, the first baffle 46 is attached and affixed to the dome 24. The second baffle 48 and the third baffle 50 are attached and affixed to the optical corrector 44. Specifically, the second baffle 48 is affixed to the optical corrector 44a, and the third baffle 50 is affixed to the optical corrector 44b. In most cases, it is preferred that the first baffle 46 be attached and affixed to the interior surface of the dome 24. The second baffle 48 and the third baffle 50 may be attached to either the interior surface 64 of the dome 24 or to the optical corrector 44.

Figure 8:
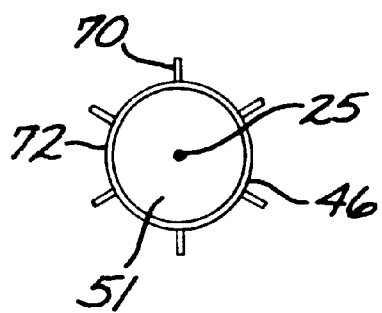
FIG. 8 is a sectional view of one of the baffles of FIG. 7, taken on line 8—8.

FIG. 7 also illustrates the addition of a set of fins 70 to at least one of the baffles, in this case the first baffle 46. The fins 70 are made of the same material as the baffle. Each fin 70 extends radially outwardly from an outer surface 72 of the baffle 46 and parallel to the central axis 25. As seen in FIG. 8, the fins 70 are symmetrically positioned about the central axis 25. Preferably, there are six identical fins 70 spaced from each other at 60 degree intervals around the central axis 25, a six-fold symmetry. The fins 70 block additional stray light rays that propagate at a large angle to the central axis 25, at the cost of additional attenuation of the intended optical ray 40 and additional infrared signature interposed in the field of view.

Figure 9A:
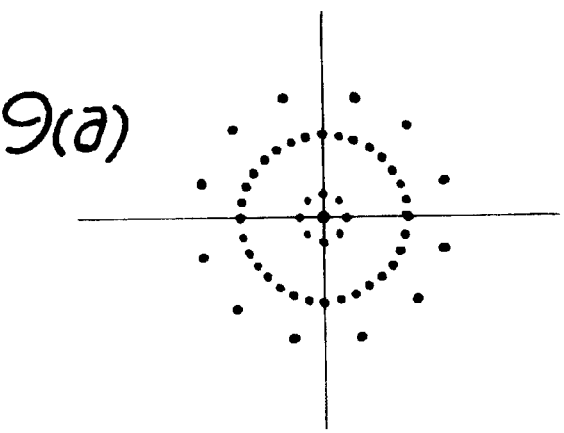
Figure 9B:
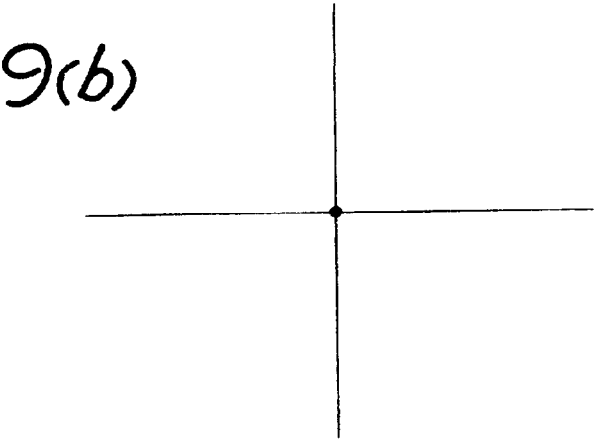

The present invention has been reduced to practice in a computer simulation using the Code V and ASAP optical software discussed earlier, and an exemplary dome 24 and optical corrector 44. FIG. 9(a) illustrates the performance of the optical system 30 without the baffles, and FIG. 9(b) illustrates the performance of the optical system with the three baffles as discussed earlier. Much more stray light reaches the sensor 34 in the case where there are no baffles present, FIG. 9(a).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:
   a nonspherical outer dome that is rotationally symmetric about a central axis;
   a detector system including a sensor;
   an optical corrector comprising a transparent body having an optical corrector shape responsive to a shape of the outer dome and positioned in an optical path between the outer dome and the detector system; and
   at least one baffle positioned in the optical path between the outer dome and the detector system and fixed in space relative to the central axis, each baffle comprising a frustoconical tube that is rotationally symmetric about the central axis.

2. The optical system of claim 1, wherein the at least one baffle comprises
   a single baffle.

3. The optical system of claim 1, wherein the at least one baffle comprises
   a first baffle having a first base diameter; and
   a second baffle having a second base diameter greater than the first base diameter.

4. The optical system of claim 1, wherein the at least one baffle comprises a first baffle having a first base diameter;

a second baffle having a second base diameter greater than the first base diameter; and a third baffle having a third base diameter greater than the second base diameter.

5. The optical system of claim 1, wherein at least one baffle is fixed to an inner surface of the outer dome.

6. The optical system of claim 1, wherein at least one baffle is fixed to a surface of the optical corrector.

7. The optical system of claim 1, wherein the at least one baffle includes a finned baffle having a set of fins supported thereon, each fin extending radially outwardly from an outer surface of the baffle and parallel to the central axis.

8. The optical system of claim 1, wherein the fins are symmetrically positioned about the central axis.

9. The optical system of claim 1, wherein the at least one baffle includes a finned baffle located closer to the central axis than any other baffle, the finned baffle having a set of fins supported thereon, each fin extending radially outwardly from an outer surface of the baffle and parallel to the central axis.

10. The optical system of claim 1, wherein the outer dome has a nose intersected by the central axis, and wherein the at least one baffle comprises a first baffle having a first base diameter and an extrapolated first apex at a first apex distance from the nose; and a second baffle having a second base diameter greater than the first base diameter and an extrapolated second apex at a second apex distance from the nose, the second apex distance being smaller than the first apex distance.

11. The optical system of claim 1, wherein the at least one baffle comprises a first baffle located nearer the central axis than any other frustoconical baffle, the first baffle having a first base diameter substantially equal to a diameter of an entrance pupil of the optical system.

12. The optical system of claim 1, wherein the at least one baffle comprises a first baffle located nearer the central axis than any other frustoconical baffle, the first baffle having a first base diameter substantially equal to a diameter of an entrance pupil of the optical system and a length such that no interior reflected rays may pass through its center.

13. The optical system of claim 1, wherein the at least one baffle comprises a first baffle located nearer the central axis than any other frustoconical baffle, the first baffle having a first base diameter substantially equal to a diameter of an entrance pupil of the optical system, and a length such that no interior reflected rays may pass through its center; and a second baffle having a second base diameter greater than the first base diameter and such that a first skew ray may reflect off the outer dome and pass completely around the first baffle, and a length such that no interior reflected rays may pass through its center.

14. An optical system, comprising:

a nonspherical outer dome that is rotationally symmetric about central axis;

a detector system including a sensor;

an optical corrector comprising a transparent body having an optical corrector shape responsive to a shape of the outer dome and positioned in an optical path between the outer dome and the detector system; and at least one baffle positioned in the optical path between the outer dome and the detector system and fixed in space relative to the central axis, each baffle comprising a frustoconical tube that is rotationally symmetric about the central axis and is fixed to one of the outer dome and the optical corrector, the at least one baffle comprising a first baffle having a first base diameter; and a second baffle having a second base diameter greater than the first base diameter.

* * * * *